W. J. BUTTS.
Cotton-Press.

No. 214,619.      Patented April 22, 1879.

WITNESSES:
C. Neveux
C. Sedgwick

INVENTOR:
W. J. Butts
BY
Munn & Co
ATTORNEYS.

UNITED STATES PATENT OFFICE.

WILIE J. BUTTS, OF WILLOW GREEN, NORTH CAROLINA.

IMPROVEMENT IN COTTON-PRESSES.

Specification forming part of Letters Patent No. 214,619, dated April 22, 1879; application filed January 9, 1879.

*To all whom it may concern:*

Be it known that I, WILIE J. BUTTS, of Willow Green, in the county of Green and State of North Carolina, have invented a new and Improved Cotton-Press, of which the following is a specification.

Figure 1:
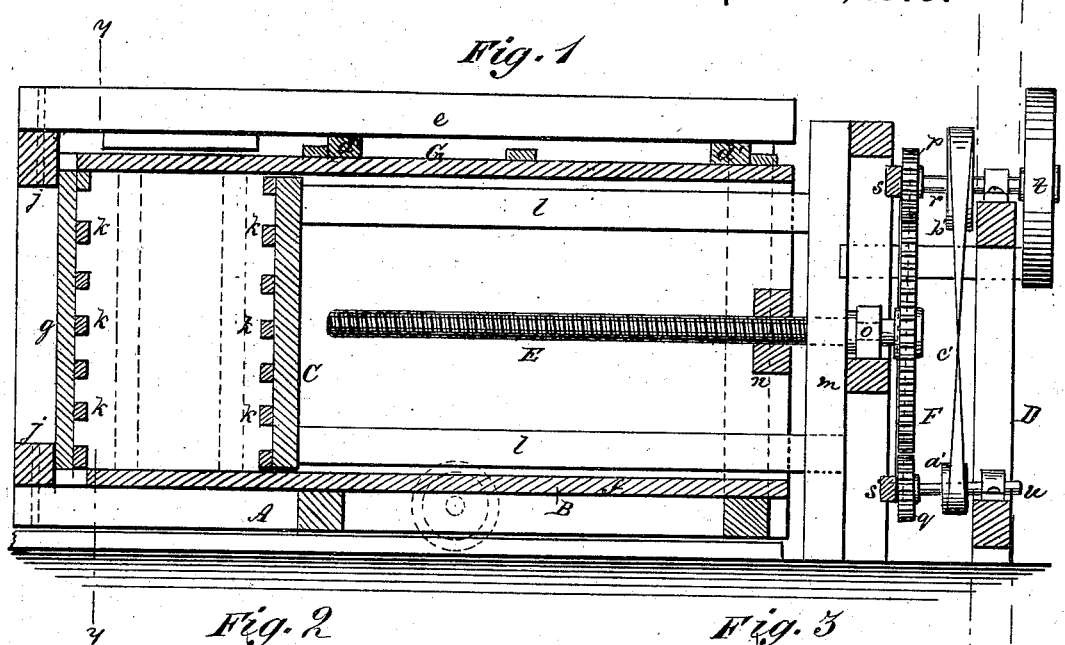
Figure 2:
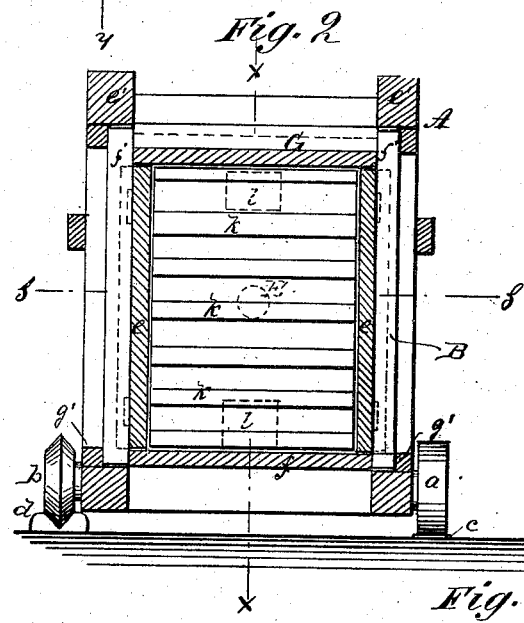
Figure 3:
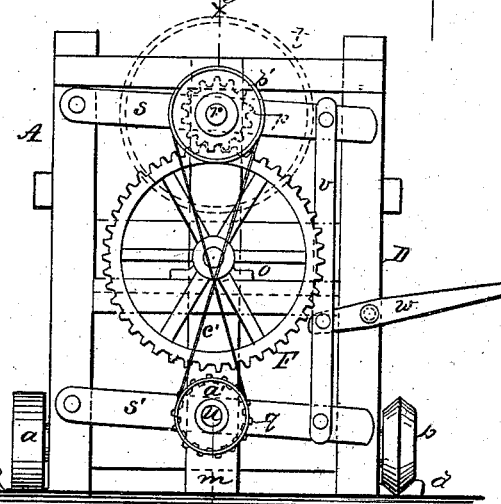
Figure 4:
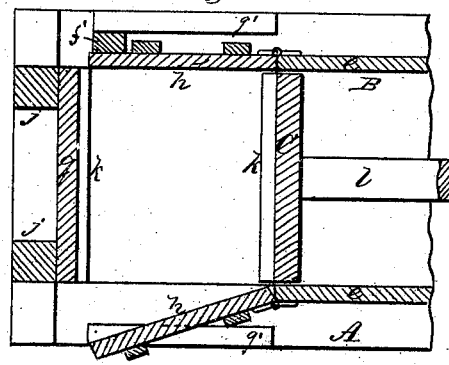

Figure 1 is a longitudinal vertical section taken on line $x\ x$ in Figs. 2 and 3. Fig. 2 is a vertical transverse section taken on line $y\ y$ in Fig. 1. Fig. 3 is an end elevation, partly in section. Fig. 4 is a horizontal section taken on line $z\ z$ in Fig. 2.

Similar letters of reference indicate corresponding parts.

My invention relates to presses for compressing cotton and other similar materials; and it consists in a horizontal box mounted on wheels and drawn forward by a screw, so that the ribbed bed in the end of the box is drawn forward toward a fixed ribbed platen, so as to compress the cotton contained by the box between the bed and platen.

It also consists in a novel arrangement for driving the screw, which imparts to it a slow motion while the bale is being pressed, but gives it a rapid return movement.

Referring to the drawings, A is a strong frame, which is balanced on the wheels $a\ b$. The wheel $a$ has a plain flat periphery, and moves on the flat track-rail $c$. The wheel $b$ has a V-shaped periphery, and rolls on a track, $d$, having a V-shaped groove.

The frame A contains a box, B, the sides $e$, bottom $f$, and outer end or bed, $g$, of which are secured to the frame. A portion, $h$, of each side $e$ is hinged to admit of tying and removing the bale. The platen $g$, which is secured to cross-timbers $j$ at the end of the frame A, is provided with transverse ribs $k$, between which to pass the bale-bands, and the platen C, which is secured to horizontal timbers $l$, is also provided with transverse ribs $k$ for the same purpose.

The timbers $l$ are secured to a post, $m$, of the stationary frame D. In this frame a screw, E, is journaled, which passes through a nut formed in the cross-bar $n$ of the frame A. The screw is prevented from end motion by shoulders formed at each side of the box $o$, in which it is journaled.

Upon the outer end of the screw a spur-wheel, F, is secured. This wheel may be engaged by either of the pinions $p\ q$. The pinion $p$ is placed above the spur-wheel F on the drive-shaft $r$, one end of which is journaled in a pivoted bar, $s$, and the other end is journaled in the frame D. Upon the outer end of the shaft $r$ there is a pulley, $t$, which receives the driving-belt.

The pinion $q$ is placed below the spur-wheel F on the shaft $u$, one end of which is journaled in the frame D, while the other end is journaled in the pivoted bar $s'$. The pivoted bars $s\ s'$ are connected together by the bar $v$, and the said bar is pivoted to a shifting-lever, $w$, that is fulcrumed in the frame D. By means of this lever the bars $s\ s'$ may be moved, so as to throw either of the pinions $p\ q$ into gear with the spur-wheel F.

Upon the shaft $u$ there is a pulley, $a'$, which takes motion from a larger pulley, $b'$, on the shaft $r$ by the crossed belt $c'$.

The box B has a removable top, G, that is held in place by cross-bars $d'$, whose ends are placed under the timbers $e'$ of the frame A. The hinged portions $h$ of the side pieces, $e$, are fastened by bars $f'$, whose ends are placed behind cleats $g'$, secured to the upper and lower timbers of the frame A.

The operation of my improved press is as follows: The box B is moved outward as far as possible, when the top G is removed and the box is filled with cotton from the lint-room above. The cover G is then put on and secured by means of the bars $d'$. The pinion $p$ is then thrown into gear with the spur-wheel F, and the box is drawn toward the frame D until the cotton between the bed $g$ and platen C is compressed, so that it may be removed from the box B through the openings which are closed by the hinged portions or doors $h$. The pinion $p$ is then disengaged from the wheel F, and the doors $h$ are opened and the bale is tied in the usual way. The pinion $q$ is then thrown into the spur-wheel F to retract the screw. While this is being done the bale is removed and the press is made ready for refilling.

There is sufficient space around the platen C and bed $g$ to admit of placing in the press the bagging used in covering the bale.

Having thus described my invention, I claim as new and desire to secure by Letters Patent—

1. The combination, in a cotton-press, of the movable frame A, mounted on wheels $a\ b$, and carrying the press-box B, with the stationary platen C and the operating-screw E, substantially as herein shown and described.

2. The driving mechanism consisting of the spur-wheel F, secured to the screw E, the pinions $p\ q$, mounted on movable shafts, the pulleys $a'\ b'$, and connecting-belt $c'$, in combination, substantially as specified.

3. The combination of the pivoted bars $s\ s'$, connecting-bar $v$, and shifting-lever $w$ with the pinions $p\ q$, substantially as shown and described.

WILIE J. BUTTS.

Witnesses:
C. SEDGWICK,
GEO. M. HOPKINS.